United States Patent

[11] 3,633,098

[72] Inventor Robert L. Westlund
 Yukon, Okla.
[21] Appl. No. 877,094
[22] Filed Nov. 17, 1969
[45] Patented Jan. 4, 1972
[73] Assignee Western Electric Company, Incorporated
 New York, N.Y.

[54] ELECTRICAL COMPONENT TESTING APPARATUS HAVING A TEMPERATURE-COMPENSATING CIRCUIT
4 Claims, 1 Drawing Fig.

[52] U.S. Cl. ............................................. 324/62 R
[51] Int. Cl. ............................................. G01n 27/02
[50] Field of Search .............................. 324/57, 62, 65, 64

[56] References Cited
UNITED STATES PATENTS
3,497,803  2/1970  Fegan, Jr. ..................... 324/65

*Primary Examiner*—Edward E. Kubasiewicz
*Attorneys*—H. J. Winegar, R. P. Miller and A. C. Schwarz, Jr.

ABSTRACT: In testing apparatus in which voltages are developed across an electrical component and a standard resistance and are compared to determine whether the resistance of the electrical component falls within desired limits, temperature-compensating circuitry is provided for modifying the voltage developed across the standard resistance in response to changes in temperature and as a direct function of the temperature coefficient of resistance of a specific electrically conducting material in the electrical component. The temperature compensating circuitry is adjustable over a preselected range in accordance with the percentage of the specific electrically conducting material in the electrical component, and is connected between the standard resistance and a comparator circuit so as to feed the modified voltage to the comparator circuit for comparison with the voltage developed across the electrical component.

PATENTED JAN 4 1972
3,633,098
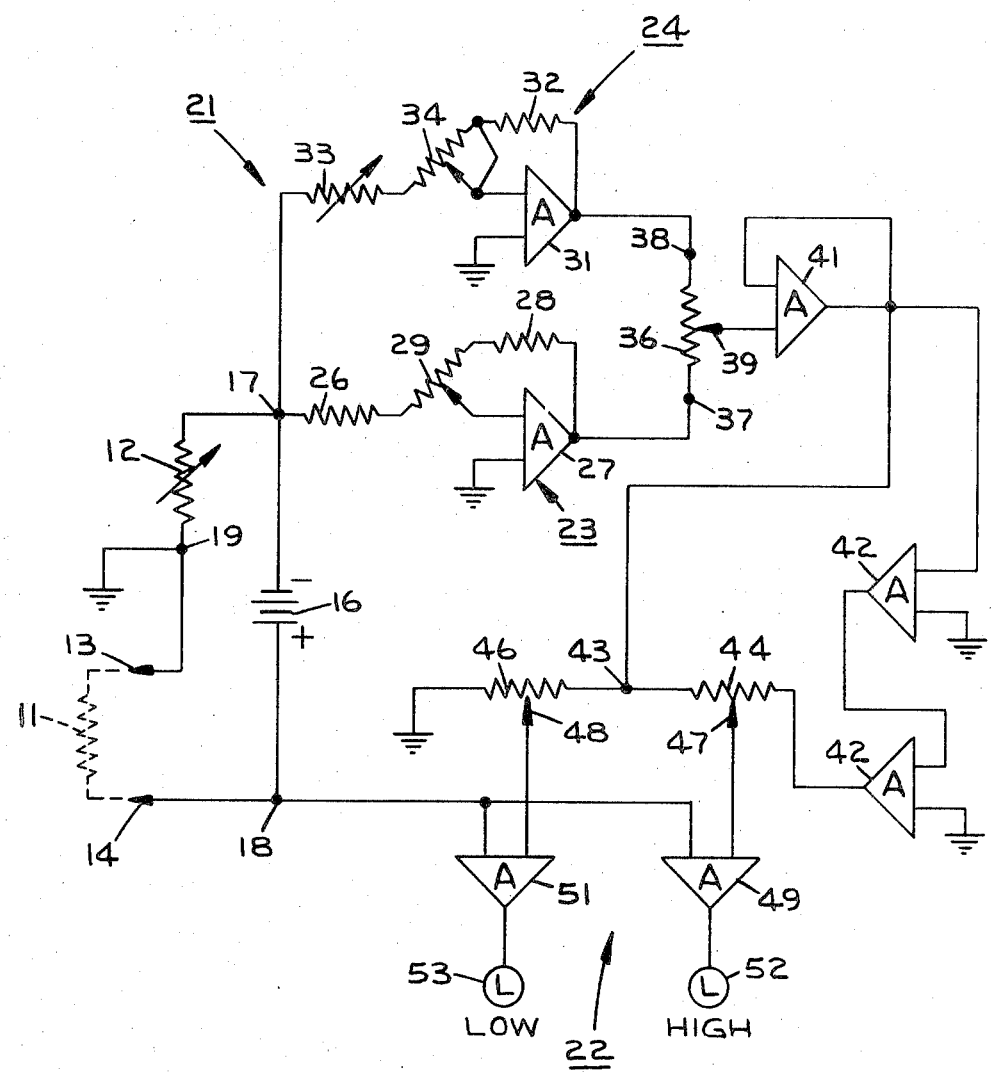
INVENTOR
R.L. WESTLUND
BY D.W. Bosben
ATTORNEY

ELECTRICAL COMPONENT TESTING APPARATUS HAVING A TEMPERATURE-COMPENSATING CIRCUIT

BACKGROUND OF THE INVENTION

1. Field of the Invention

This invention relates to apparatus for testing electrical components, and more particularly to apparatus for testing the resistance of an electrical component in which the percentage of a specific electrically conducting material in the electrical component may vary and in which the environment in which the electrical components are being tested is subject to temperature change.

2. Description of the Prior Art

In the manufacture of certain electrical components, such as coils for electromechanical relays used in telephone switching systems, it is standard practice to test the direct current resistance of each coil to ascertain whether it is equal to a desired standard value within permissible tolerance limits. Generally, the test is performed in the factory at the ambient or room temperature by comparison-type apparatus in which a voltage is developed across the coil and is compared with a voltage which is developed across a standard resistance.

Frequently, the same test apparatus is utilized for testing a number of different types of coils which are constructed of different percentages of copper and which therefore have different temperature coefficients of resistance. Accordingly, since the ambient temperature in the factory tends to vary considerably it is necessary to compensate for this fact in order to obtain accurate test results.

Heretofore, this has been accomplished in a number of different ways. For example, it is standard practice to provide a different standard resistance for each type of coil and to construct the standard resistance of the same material as its associated coil, thereby minimizing errors due to changes in ambient temperature. This procedure, however, is undesirable where a large number of different types of coils are to be tested because of the large number of standard resistances required. Further, this procedure is inaccurate, particularly when a large number of coils are tested in succession using the same standard resistance, because while each coil tested is initially at room temperature, the standard resistance becomes successively warmer with each test, whereby its resistance progressively changes according to its temperature coefficient of resistance.

It also is common practice to test the resistance of coils utilizing a bridge circuit, one branch of which includes a coil under test and another branch of which includes a standard resistance in series with a trimmer resistance. The standard resistance and the trimmer resistance both have a low or near zero temperature coefficient of resistance and the trimmer resistance is calibrated in degrees Fahrenheit to compensate for the change in the resistivity of copper with changes in ambient temperature. In testing a series of a particular type of coil in this system the operator initially reads a precision thermometer to obtain the ambient temperature and adjusts the temperature-compensating resistance accordingly. Subsequently, as the testing of the coils proceeds, the operator periodically refers to the thermometer and adjusts the temperature-compensating resistance in the bridge as necessary.

This system is undesirable because the ambient temperature may change between the times that the operator checks the temperature, or the operator may neglect to make the periodic temperature checks and the necessary corrections on the temperature-compensating resistance. The system also is subject to error on the part of the operator in making the periodic temperature readings and resistance settings.

SUMMARY OF THE INVENTION

An object of this invention is to provide new and improved apparatus for testing electrical components, in which variations in ambient temperature are compensated for automatically.

In accordance with the invention, voltages are developed across an electrical component and a standard resistance and the voltage developed across the standard resistance is fed to a temperature-compensating means for modifying the voltage in response to changes in temperature and as a function of the temperature coefficient of resistance of a specific electrically conducting material in the electrical component. The temperature-compensating means is adjustable over a preselected range in accordance with the percentage of the specific electrically conducting material in the electrical component and is connected between the standard resistance and a comparing means so as to feed the modified voltage to the comparing means for comparison with the voltage developed across the electrical component.

More specifically, the temperature-compensating means includes two amplifying circuits connected in parallel and both driven by the voltage developed across the standard resistance. The first amplifying circuit has a constant gain and therefore an output voltage which is in direct proportion to the voltage developed across the standard resistance. The second amplifying circuit has a gain which varies in response to changes in ambient temperature and as a direct function of the temperature coefficient of resistance of the specific electrically conducting material, and accordingly has an output voltage which is proportional to the voltage developed across the standard resistance as a direct function of the temperature coefficient of resistance of the specific electrically conducting material. Adjustment of the temperature-compensating means in accordance with the percentage of the specific electrically conducting material in the electrical component is accomplished by a voltage tap and a resistance connected across the outputs of the amplifying circuits such that the voltages at successive points on the resistance vary as a function of the temperature coefficient of resistance of the specific electrically conducting material, from an optimum voltage which is representative of the optimum resistance for an electrical component containing zero percent of the material to an optimum voltage which is representative of the optimum resistance for an electrical component containing 100 percent of the material. Buffer amplifying means is provided for feeding the voltage at the voltage tap to the comparing means and for isolating the voltage tap from the comparing means.

BRIEF DESCRIPTION OF THE DRAWING

The drawing shows an electrical circuit for test apparatus in accordance with the invention.

DETAILED DESCRIPTION

Referring to the drawing, the disclosed embodiment of the invention is designed for testing the direct current resistance of relay coils 11, one of which is illustrated schematically in the drawing as a resistance under test, to determine whether the resistance of the coils is equal to that of a desired standard within certain limits. The apparatus is specifically designed for testing relay coils 11 of different types, wherein each type of coil is constructed of a material containing a different percentage of an electrically conducting material, such as copper, and thus has a different temperature coefficient of resistance.

The apparatus includes a standard resistor 12, which is of a precision type having a zero temperature coefficient of resistance and which is adjustable to a resistance value equal to an optimum resistance for the coils 11 being tested. The standard resistor 12 and contacts 13 and 14 of a suitable receptacle (not shown) for receiving one of the coils 11 during a test operation are connected in series across a battery 16 through respective terminals 17 and 18, and a junction terminal 19 between the standard resistor and the adjacent contact 13 is grounded. Thus, when one of the coils 11 is inserted in the receptacle for testing, as illustrated in the drawing, since the same current flows through the coil and the standard resistor 12, the voltage at each of the terminals 17 and 18 is of a magnitude which is proportional to the value of the standard resistor and the resistance of the coil, respectively.

In the illustrated embodiment of the invention, the voltage developed across the standard resistor 12 and appearing at the terminal 17 is fed to a temperature-compensating circuit 21, which modifies the voltage automatically in response to changes in ambient temperature and as a function of the temperature coefficient of resistance of copper. This modified voltage then is fed to a comparator circuit 22 for comparison with the voltage developed across the coil 11 under test and appearing at the terminal 18, to determine whether the resistance of the coil is within acceptable limits.

The temperature-compensating circuit 21 includes two amplifying circuits 23 and 24 connected in parallel and both driven by the voltage appearing at the terminal 17. The first amplifying circuit 23 includes an input resistor 26 and a direct current amplifier 27 having a feedback loop giving it a gain of exactly minus one. In this connection, the feedback loop includes a feedback resistor 28 and an adjustable resistor 29 which may be used to compensate for normal tolerance deviations in the resistance values of the resistors 26 and 28 and to adjust the gain of the amplifier to exact unity. The resistors 26, 28 and 29 all have a zero temperature coefficient of resistance. Thus, the output voltage of the amplifier 27 is equal in magnitude to the voltage developed across the standard resistor 12 and appearing at the terminal 17, but of opposite polarity.

The second amplifying circuit 24 includes a direct current amplifier 31 having a normal gain of minus one, but having a feedback loop which includes only a resistor 32 of pure copper. The amplifying circuit 24 also includes adjustable input resistors 33 and 34, the resistor 34 being used for fine adjustment and having a resistance value of approximately 1 percent of that of the resistor 33. The input resistors 33 and 34 both have a zero temperature coefficient of resistance, and in operation are adjusted so that their combined effective resistance matches the resistance of the pure copper feedback resistor 32 at a fixed reference temperature, such as 68° F. Accordingly, the gain of the amplifier 31 varies with ambient temperature as a function of the temperature coefficient of resistance of copper, and the output voltage of the amplifier is proportional to the voltage developed across the standard resistor 12 and appearing at the terminal 17 as a direct function of the temperature coefficient of resistance of copper, but of opposite polarity.

The temperature-compensating circuit 21 also includes a linear proportioning resistor 36 which is connected across the outputs of the amplifiers 27 and 31. Thus, the voltages on successive points of the resistor 36 vary as a function of the temperature coefficient of resistance of copper, from an optimum voltage which should be developed across the coil 11 under test if it contains zero percent copper, at a terminal 37, to an optimum voltage which should be developed across the coil if it contains 100 percent copper, at a terminal 38. The proportioning resistor 36 includes a tap 39 for tapping voltage off of the resistor depending upon the percentage of copper in the particular type of coil 11 under test, and connected to feed this voltage to a direct current buffer amplifier 41 having a gain of exactly one and preferably of an emitter follower type requiring no adjustment. As will be apparent to those skilled in the art, the proportioning resistor 36 may be suitably calibrated in terms of the percentage of copper in the coil 11 being tested, to facilitate the adjustment of the tap 39.

The voltage output of the buffer amplifier 41, which is equal to the voltage at the tap 39 and of the same polarity, feeds by separate leads to both a two stage direct current amplifier 42 and a junction terminal 43 between two precision voltage divider resistors 44 and 46 of equal magnitude, in the comparator circuit 22. The amplifier 42, which is adjustable (by circuitry not shown) so as to have a gain of exactly two, doubles the voltage without inversion and feeds it through the two precision voltage divider resistors 44 and 46, to ground. Thus, the voltage appearing at the junction terminal 43 between the resistors 44 and 46 always is equal to the voltage output of the buffer amplifier 41 and the voltage at the voltage tap 39 on the linear proportioning resistor 36. In this connection, the buffer amplifier 41 isolates the tap 39 from the resistor 46 so that the resistor 46 has no effect on the voltage appearing at the tap. The buffer amplifier 41 also isolates the linear proportioning resistor 36 from the amplifier 42 so that adjustment of the tap 39 on the resistor, with the resultant changes in resistance between the tap and the terminals 37 and 38, will have no effect on the gain of the amplifier and its gain always will be constant.

The comparator circuit 22 now determines whether the resistance of the coil 11 under test meets required tolerance limits. In this connection, an upper limit variable-voltage tap 47 on the resistor 44 and a lower limit variable-voltage tap 48 on the resistor 46 deliver to a pair of comparing amplifiers 49 and 51, voltages which are slightly higher and slightly lower than the optimum voltage at the junction terminal 43 and which represent upper and lower tolerance limits for the coil 11 under test, respectively. The voltage developed across the coil 11 under test and appearing at the terminal 18 also feeds to the two comparing amplifiers 49 and 51. Accordingly, if the voltage developed across the coil 11 is greater than the reference voltage delivered to the comparing amplifier 49 from the upper limit tap 47 on the resistor 44, this comparing amplifier will energize a suitable indicating device, such as a lamp 52, in a well-known manner. Similarly, if the voltage across the coil 11 is less than the reference voltage delivered to the comparing amplifier 51 from the lower limit tap 48 on the resistor 46, this comparing amplifier will light an indicating lamp 53. If neither of the lamps 52 and 53 is lighted, the resistance of the coil 11 being tested is within acceptable tolerance limits.

Preferably, the resistance values of the input resistors 26 and 33 and of the feedback resistors 28 and 32 in the temperature compensating circuit 21 are relatively high so as to limit the current flow in this circuit to several microamperes. This reduces the tendency for the resistivity of the temperature compensating circuit 21 to be affected by internal heating because of excessive current flow therethrough, with the resultant introduction of errors into the system. At the same time, of course, the resistance values should not be too great because if the impedance of the system is too high there will be a tendency for electrical noise to be introduced into it from adjacent electrical equipment. In this connection, favorable operating results have been achieved utilizing resistors 26, 28 and 32 of 7.5 kilohms and a resistor 33 of 10 kilohms, with the input resistor 33 and its associated input resistor 34 adjusted to match the pure copper feedback resistor 32 at a fixed reference temperature as indicated hereinabove. The linear proportioning resistor 36 and the voltage divider resistors 44 and 46 are selected to present a light to normal current load for the amplifiers 27, 31 and 41 and in practice a resistance value of 10 kilohms for each of these resistors has been found to be suitable.

OPERATION

In preparing the apparatus for general use, the resistor 29 in the first amplifying circuit 23 is adjusted so that the circuit has a gain of exactly minus one (unity); the input resistors 33 and 34 in the amplifying circuit 24 are adjusted so that their effective resistance matches the resistance of the pure copper feedback resistor 32 at a suitable reference temperature, such as 68° F; the amplifier 41, if an adjustable type is used, is adjusted so that it has a gain of exactly one; and the amplifier 42 is adjusted so that it has a gain of exactly two. This circuitry, which normally needs no further adjustment, then is suitably enclosed so as to be inaccessible to the operator during test operations.

In testing a particular type of the coils 11 which contain a certain percentage of copper, the standard resistor 12 is adjusted to the optimum resistance for the coils; the tap 39 is set on the linear proportioning resistor 36 in accordance with the percentage of copper in the coils; and the taps 47 and 48 on the voltage divider resistors 44 and 46 are set to represent upper and lower resistance tolerance limits for the coils, respectively. One of the coils 11 then is positioned in the receptacle contacts 13 and 14, whereupon voltages are produced at the terminals 17 and 18 which are of a magnitude proportional to the resistance of the standard resistor 12 and the resistance of the coil 11, respectively.

The voltage at the terminal 17 drives both of the amplifying circuits 23 and 24 of the temperature-compensating circuit 21, and since the amplifying circuit 23 has a constant gain of exactly minus one its output voltage is exactly equal to the voltage developed across the standard resistor 12, but of opposite polarity. However, since the gain of the second amplifying circuit 24 varies in response to change in ambient temperature (from the reference temperature of 68° F.) as a direct function of the temperature coefficient of resistance of copper, its output voltage is proportional to the voltage developed across the standard resistor 12 as a direct function of the temperature coefficient of resistance of copper. Thus, the voltage appearing at the terminal 37 is representative of the optimum resistance for the coil 11 if it contained no copper; the voltage appearing at the terminal 38 is representative of the optimum resistance for the coil 11 if it contained 100 percent copper; and the voltage at the tap 39 on the linear proportioning resistor 36 is representative of the optimum resistance for the coil 11 in accordance with the percentage of copper which it actually contains.

The voltage at the tap 39 drives the buffer amplifier 41, which has a gain of exactly one, whereby its output voltage is equal to the voltage at the tap and of the same polarity. The output voltage of the buffer amplifier 41 then is delivered to both the junction terminal 43 between the precision voltage divider resistors 44 and 46, and to the amplifier 42, of the comparator circuit 22. The amplifier 42, which has a gain of exactly two, doubles the voltage received from the buffer amplifier 41, without inversion, and feeds it through the voltage divider resistors 44 and 46, to ground. Thus, the voltage appearing at the junction terminal 43 between the resistors 44 and 46 is equal to the voltage output of the buffer amplifier 41 and to the voltage appearing at the tap 39 on the linear proportioning resistor 36.

The comparator circuit 22 then determines whether the coil 11 under test meets the required tolerance limits. In this regard, the voltage taps 47 and 48 on the voltage divider resistors 44 and 46 deliver to the comparing amplifiers 49 and 51, voltages which are slightly higher and slightly lower, respectively, than the optimum voltage at the junction terminal 43. If the voltage developed across the coil 11 and being fed to the comparing amplifiers 49 and 51 from the terminal 18 is greater than the voltage received by the amplifier 49 from the tap 47, the amplifier will light the indicating lamp 52. Similarly, if the voltage developed across the coil 11 is less than the voltage received by the amplifier 51 from the tap 48, this amplifier will light the indicating lamp 53. If neither of the lamps 52 and 53 is lighted, the resistance of the coil 11 is within the acceptable tolerance limits.

What is claimed is:

1. In apparatus in which a voltage developed across an electrical component and a voltage developed across a standard resistance are fed to a comparing means for determining whether the resistance of the electrical component falls within desired limits, and in which the percentage of a specific electrically conducting material in the electrical component may vary, the improvement which comprises:
temperature-compensating means for modifying the voltage developed across the standard resistance in response to changes in temperature and as a direct function of the temperature coefficient of resistance of the specific electrically conducting material, said temperature-compensating means being adjustable over a preselected range in accordance with the percentage of the specific electrically conducting material in the electrical component and being connected between the standard resistance and the company means so as to feed the modified voltage to the comparing means for comparison with the voltage developed across the electrical component.

2. In apparatus as recited in claim 1, the improvement which further comprises:
said temperature-compensating means being responsive to the voltage developed across the standard resistance for developing voltages over a range from a voltage which is representative of an optimum resistance for an electrical component containing zero percent of the specific electrically conducting material to a voltage which is representative of an optimum resistance for an electrical component containing 100 percent of the specific electrically conducting material; and
means for feeding a voltage in accordance with the percentage of the specific electrically conducting material in the electrical component under test, from said temperature-compensating means to the comparing means.

3. In apparatus in which a voltage developed across an electrical component and a voltage developed across a standard resistance are fed to a comparing means for determining whether the resistance of the electrical component falls within desired limits, and in which the percentage of a specific electrically conducting material in the electrical component may vary, the improvement which comprises:
temperature-compensating means for modifying the voltage developed across the standard resistance in response to changes in temperature and as a direct function of the temperature coefficient of resistance of the specific electrically conducting material, said temperature-compensating means including first and second amplifying circuits connected in parallel;
means for feeding the voltage developed across the standard resistance to both of said amplifying circuits;
said first amplifying circuit having a constant gain and having an output voltage representative of the voltage developed across the standard resistance;
said first amplifying circuit having a gain which varies in response to changes in temperature and as a direct function of the temperature coefficient of resistance of the specific electrically conducting material; and having an output voltage which varies in proportion to the voltage developed across the standard resistance as a direct function of the temperature coefficient of resistance of the specific electrically conducting material;
a resistance connected across outputs of said amplifying circuits such that the voltages at successive points on said resistance vary as a function of the temperature coefficient of resistance of the specific electrically conducting material, from a voltage which is representative of an optimum resistance for an electrical component containing a preselected lower percentage of the specific electrically conducting material to a voltage which is representative of an optimum resistance for an electrical component containing a preselected upper percentage of the specific electrically conducting material;
means for tapping voltage off of said resistance in accordance with the percentage of the specific electrically conducting material in the electrical component under test; and
means for feeding the tapped voltage to the comparing means.

4. In apparatus as recited in claim 3, the improvement which further comprises:
said first amplifying circuit having a gain of unity and including an input resistance and a feedback resistance of the same relatively high resistance value, said resistances each having a zero temperature coefficient of resistance; and
said second amplifying circuit including an input resistance and a feedback resistance of the same relatively high resistance value at a fixed reference temperature, the input resistance having a zero temperature coefficient of resistance and the feedback resistance being made of the specific electrically conducting material.

UNITED STATES PATENT OFFICE
CERTIFICATE OF CORRECTION

Patent No. 3,633,098     Dated January 4, 1972

Inventor(s) R. L. Westlund

It is certified that error appears in the above-identified patent and that said Letters Patent are hereby corrected as shown below:

Column 5, line 13, "change" should read --changes--. Column 5, line 75, "company" should read --comparing--. Column 6, line 37, "first" should read --second--.

Signed and sealed this 30th day of May 1972.

(SEAL)
Attest:

EDWARD M. FLETCHER, JR.
Attesting Officer

ROBERT GOTTSCHALK
Commissioner of Patents